United States Patent
Grani et al.

(10) Patent No.: US 12,363,495 B2
(45) Date of Patent: Jul. 15, 2025

(54) METHOD, APPARATUS AND COMPUTER PROGRAM PRODUCT FOR SYNTAX BASED DYNAMIC AUDIO SHIFTING

(71) Applicant: HERE GLOBAL B.V., Eindhoven (NL)

(72) Inventors: Francesco Grani, Berlin (DE); Thomas Lucka, Fahrland (DE); Mario Lopez Batres, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 275 days.

(21) Appl. No.: 17/452,819

(22) Filed: Oct. 29, 2021

(65) Prior Publication Data
US 2023/0138757 A1 May 4, 2023

(51) Int. Cl.
*H04S 7/00* (2006.01)
*G01C 21/36* (2006.01)
*G06F 18/2431* (2023.01)

(52) U.S. Cl.
CPC .......... *H04S 7/303* (2013.01); *G01C 21/3629* (2013.01); *G06F 18/2431* (2023.01); *H04S 2400/11* (2013.01)

(58) Field of Classification Search
CPC ...... H04S 7/303; H04S 2400/11; H04S 7/302; G01C 21/3629; G06F 18/2431; H04R 2499/13
See application file for complete search history.

(56) References Cited

U.S. PATENT DOCUMENTS

| 9,009,042 B1 * | 4/2015 | Quasthoff ........... G10L 15/1822 379/88.04 |
| 10,477,338 B1 | 11/2019 | Grani et al. |
| 2006/0271283 A1 * | 11/2006 | Fraser ................ G01C 21/3641 340/995.19 |

(Continued)

OTHER PUBLICATIONS

U.S. Appl. No. 17/080,259, filed Oct. 26, 2020; In re: Grani et al., entitled "Method, Apparatus and Computer Program Product for Temporally Based Dynamic Audio Shifting", 47 pages.

(Continued)

*Primary Examiner* — Phung-Hoang J Nguyen
(74) *Attorney, Agent, or Firm* — ALSTON & BIRD LLP

(57) ABSTRACT

A method, apparatus, and computer program product are therefore provided for providing syntax-based spatial auditory cues to facilitate user interaction with navigational assistance or at least semi-autonomous vehicle control. Methods may include: receiving an indication of location based information; parsing the location based information into one or more portions of information; classifying the one or more portions of information based on a syntax of one or more words contained in the one or more portions to obtain one or more classified portions of information; determining, for a respective one of the one or more classified portions of information, a communication mode associated with the respective one of the one or more classified portions; and providing for generation of audible communication of the location based information, where the one or more classified portions are communicated according to a respective communication mode associated with the respective one or more classified portions.

18 Claims, 8 Drawing Sheets

(56) References Cited

U.S. PATENT DOCUMENTS

| | | | |
|---|---|---|---|
| 2007/0219718 A1* | 9/2007 | Pennock | G01C 21/3608 |
| | | | 701/431 |
| 2012/0250463 A1 | 10/2012 | Endo et al. | |
| 2015/0030159 A1 | 1/2015 | Ozcan | |
| 2016/0110774 A1* | 4/2016 | Ahn | G06Q 30/08 |
| | | | 705/15 |
| 2018/0081906 A1* | 3/2018 | Katz | G06F 16/3329 |
| 2020/0228914 A1 | 7/2020 | Engle | |
| 2020/0264006 A1 | 8/2020 | Sommer et al. | |
| 2021/0149963 A1* | 5/2021 | Agarwal | G06F 16/90332 |

OTHER PUBLICATIONS

Sanuki et al., "Spatial Sound for Mobile Navigation System", Proceedings of the 136th Audio Engineering Society Convention, (Jan. 2014), 4 pages.

* cited by examiner

[English] in three kilometers turn left into Kaiser Damm

[German] in drei Kilometern links in den Kaiserdamm einbiegen

[Italian] in tre chilometri girare a sinistra in Kaiser Damm

[French] à trois kilomètres, tourner à gauche dans Kaiser Damm

[Japanese] 3キロ先で左折してKaiser Dammに入る

[Spanish] en tres kilómetros gire a la izquierda en Kaiser Damm

[Hungarian] három kilométeren belül forduljon balra a Kaiser Dammra

FIG. 4

| Class | Element | Spatial Audio Action (Mode) |
|---|---|---|
| Preposition | In | Do not spatialize sound here |
| Information - distance | five kilometers | Select Far-away maneuver type sound spatialization |
| Information – action | Turn | Audio Movement: Turn type sound spatialization |
| Information – direction | left | Audio Movement: Left side sound spatialization |
| Preposition | onto | Keep sound onto the last position |
| Information – next street | State Street | Keep sound onto the last position |

FIG. 5

```
<span class="static"> In </span>
<span class="distance"> five kilometers </span>
<span class="actiontype"> turn </span>
<span class="direction"> left </span>
<span class="static"> onto </span>
<span class="next-street">State Street</span>.
```

FIG. 7

METHOD, APPARATUS AND COMPUTER PROGRAM PRODUCT FOR SYNTAX BASED DYNAMIC AUDIO SHIFTING

TECHNOLOGICAL FIELD

An example embodiment of the present invention relates generally to navigation assistance and user interface techniques, and more particularly, to a method, apparatus and computer program product for providing syntax-based spatial auditory cues to facilitate user interaction with navigational assistance or at least semi-autonomous vehicle control.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route. Further, dynamic map attributes such as route traffic, route conditions, and other dynamic map-related information may be provided to enhance the digital maps and facilitate navigation. Different map service providers along with different user interfaces (e.g., different mobile devices or different vehicle navigation systems) may result in non-uniform map and route guidance interfaces, which may not be intuitive or easily understood by a user, particularly one that is accustomed to a different type of map and navigation interface. Further, visual displays of route guidance instructions may not always be convenient or safe for a user to reference. As such, route guidance is often coupled with audible commands regarding maneuvers such as turns. However, these audible commands may be confusing or difficult to understand, for example, when provided in a complex intersection or when faced with multiple similar maneuver options.

BRIEF SUMMARY

Example embodiments therefore provided for providing a user interface for navigation and more particularly, to a method, apparatus and computer program product for providing syntax-based spatial auditory cues to facilitate user interaction with navigational assistance or at least semi-autonomous vehicle control. Embodiments provide an apparatus including at least one processor and at least one non-transitory memory including computer program code instructions, the computer program code instructions may be configured to, when executed, cause the apparatus to at least: receive an indication of location based information; parse the location based information into one or more portions of information; classify the one or more portions of information based on a syntax of one or more words contained in the one or more portions to obtain one or more classified portions of information; determine, for a respective one of the one or more classified portions of information, a communication mode associated with the respective one of the one or more classified portions of information; and provide for generation of audible communication of the location based information, where the one or more classified portions of information are communicated according to a respective communication mode associated with the respective one or more classified portions of information.

According to certain embodiments, the communication mode includes at least one of a static spatial audio effect and a dynamic spatial audio effect. Causing the apparatus of some embodiments to provide for generation of audible communication of the location based information includes causing the apparatus to: provide for generation of audible communication of a first classified portion of the one or more classified portions of information associated with a first communication mode; and provide for generation of audible communication of a second classified portion of the one or more classified portions of information associated with a second communication mode, where the first communication mode is different from the second communication mode. The first communication mode of certain embodiments includes a static spatial audio effect and the second communication mode includes a dynamic spatial audio effect.

Causing the apparatus to classify one or more portions of information based on the syntax of the one or more words contained in the one or more portions to obtain one or more classified portions of information includes causing the apparatus to: determine a first classification for a first portion of information of the one or more portions of information based on a verb within the first portion of information; and determine a second classification for a second portion of information of the one or more portions of information based on a location identifier within the second portion of information. According to some embodiments, causing the apparatus to determine, for a respective one of the one or more classified portions of information, a communication mode associated with the respective one of the one or more classified portions of information includes causing the apparatus to: determine a first communication mode associated with the first classification for the first portion of information, where the first communication mode includes a dynamic spatial audio effect; and determine a second communication mode associated with the second classification for the second portion of information, where the second communication mode includes a static spatial audio effect.

According to certain embodiments, the dynamic spatial audio effect includes an audio effect emanating from a first virtual source location, moving along a trajectory to a second virtual source location, and wherein the static spatial audio effect comprises a static spatial audio effect at the second virtual source location. According to some embodiments, the communication mode of a first classified portion of information includes a dynamic spatial audio effect with a beginning virtual source position of the respective one of the one or more classified portions of information, a trajectory along which a virtual source position moves, and an ending virtual source position, wherein the dynamic spatial audio effect further comprises a speed with which the virtual source position moves along the trajectory based on a classification of the respective one or more classified portions of information. According to further embodiments, the communication mode of a first classified portion of information comprises a static spatial audio effect having a position and an angular range about the position, wherein a virtual source position of the static audio effect is confined within the angular range about the position.

Embodiments provide a computer program product including at least one non-transitory computer readable storage medium having computer-executable program code instructions stored therein, the computer-executable program code instructions including program code instructions to: receive an indication of location based information; parse the location based information into one or more portions of information; classify the one or more portions of information based on a syntax of one or more words contained in the one or more portions to obtain one or more classified portions of information; determine, for a respective one of the one or more classified portions of information, a communication mode associated with the respective one of the one or more classified portions of information; and provide for generation of audible communication of the location based information, where the one or more classified portions of information are communicated according to a respective communication mode associated with the respective one or more classified portions of information.

According to certain embodiments, the communication mode includes at least one of a static spatial audio effect and a dynamic spatial audio effect. The program code instructions of some embodiments to provide for generation of audible communication of the location based information include program code instructions to: provide for generation of audible communication of a first classified portion of the one or more classified portions of information associated with a first communication mode; and provide for generation of audible communication of a second classified portion of the one or more classified portions of information associated with a second communication mode, where the first communication mode is different from the second communication mode. The first communication mode of certain embodiments includes a static spatial audio effect and the second communication mode includes a dynamic spatial audio effect.

The program code instructions to classify one or more portions of information based on the syntax of the one or more words contained in the one or more portions to obtain one or more classified portions of information include, in some embodiments, program code instructions to: determine a first classification for a first portion of information of the one or more portions of information based on a verb within the first portion of information; and determine a second classification for a second portion of information of the one or more portions of information based on a location identifier within the second portion of information. According to some embodiments, the program code instructions to determine, for a respective one of the one or more classified portions of information, a communication mode associated with the respective one of the one or more classified portions of information include program code instructions to: determine a first communication mode associated with the first classification for the first portion of information, where the first communication mode includes a dynamic spatial audio effect; and determine a second communication mode associated with the second classification for the second portion of information, where the second communication mode includes a static spatial audio effect.

According to certain embodiments, the dynamic spatial audio effect includes an audio effect emanating from a first virtual source location, moving along a trajectory to a second virtual source location, and wherein the static spatial audio effect comprises a static spatial audio effect at the second virtual source location. According to some embodiments, the communication mode of a first classified portion of information includes a dynamic spatial audio effect with a beginning virtual source position of the respective one of the one or more classified portions of information, a trajectory along which a virtual source position moves, and an ending virtual source position, wherein the dynamic spatial audio effect further comprises a speed with which the virtual source position moves along the trajectory based on a classification of the respective one or more classified portions of information. According to further embodiments, the communication mode of a first classified portion of information comprises a static spatial audio effect having a position and an angular range about the position, wherein a virtual source position of the static audio effect is confined within the angular range about the position.

Embodiments may provide a method including: receiving an indication of location based information; parsing the location based information into one or more portions of information; classifying the one or more portions of information based on a syntax of one or more words contained in the one or more portions to obtain one or more classified portions of information; determining, for a respective one of the one or more classified portions of information, a communication mode associated with the respective one of the one or more classified portions of information; and providing for generation of audible communication of the location based information, where the one or more classified portions of information are communicated according to a respective communication mode associated with the respective one or more classified portions of information.

According to certain embodiments, the communication mode includes at least one of a static spatial audio effect and a dynamic spatial audio effect. Providing for generation of audible communication of the location based information includes: providing for generation of audible communication of a first classified portion of the one or more classified portions of information associated with a first communication mode; and providing for generation of audible communication of a second classified portion of the one or more classified portions of information associated with a second communication mode, where the first communication mode is different from the second communication mode. The first communication mode of certain embodiments includes a static spatial audio effect and the second communication mode includes a dynamic spatial audio effect.

Classifying one or more portions of information based on the syntax of the one or more words contained in the one or more portions to obtain one or more classified portions of information includes, in some embodiments: determining a first classification for a first portion of information of the one or more portions of information based on a verb within the first portion of information; and determining a second classification for a second portion of information of the one or more portions of information based on a location identifier within the second portion of information. According to some embodiments, determining, for a respective one of the one or more classified portions of information, a communication mode associated with the respective one of the one or more classified portions of information includes: determining a first communication mode associated with the first classification for the first portion of information, where the first communication mode includes a dynamic spatial audio effect; and determining a second communication mode associated with the second classification for the second portion of information, where the second communication mode includes a static spatial audio effect.

According to certain embodiments, the dynamic spatial audio effect includes an audio effect emanating from a first virtual source location, moving along a trajectory to a second virtual source location, and wherein the static spatial audio effect comprises a static spatial audio effect at the second virtual source location. According to some embodiments, the communication mode of a first classified portion of information includes a dynamic spatial audio effect with a beginning virtual source position of the respective one of the one or more classified portions of information, a trajectory along which a virtual source position moves, and an ending virtual source position, wherein the dynamic spatial audio effect further comprises a speed with which the virtual source position moves along the trajectory based on a classification of the respective one or more classified portions of information. According to further embodiments, the communication mode of a first classified portion of information comprises a static spatial audio effect having a position and an angular range about the position, wherein a virtual source position of the static audio effect is confined within the angular range about the position.

Embodiments may provide an apparatus including: means for receiving an indication of location based information; means for parsing the location based information into one or more portions of information; means for classifying the one or more portions of information based on a syntax of one or more words contained in the one or more portions to obtain one or more classified portions of information; means for determining, for a respective one of the one or more classified portions of information, a communication mode associated with the respective one of the one or more classified portions of information; and means for providing for generation of audible communication of the location based information, where the one or more classified portions of information are communicated according to a respective communication mode associated with the respective one or more classified portions of information.

According to certain embodiments, the communication mode includes at least one of a static spatial audio effect and a dynamic spatial audio effect. The means for providing for generation of audible communication of the location based information includes: means for providing for generation of audible communication of a first classified portion of the one or more classified portions of information associated with a first communication mode; and means for providing for generation of audible communication of a second classified portion of the one or more classified portions of information associated with a second communication mode, where the first communication mode is different from the second communication mode. The first communication mode of certain embodiments includes a static spatial audio effect and the second communication mode includes a dynamic spatial audio effect.

The means for classifying one or more portions of information based on the syntax of the one or more words contained in the one or more portions to obtain one or more classified portions of information includes, in some embodiments: means for determining a first classification for a first portion of information of the one or more portions of information based on a verb within the first portion of information; and means for determining a second classification for a second portion of information of the one or more portions of information based on a location identifier within the second portion of information. According to some embodiments, the means for determining, for a respective one of the one or more classified portions of information, a communication mode associated with the respective one of the one or more classified portions of information includes: means for determining a first communication mode associated with the first classification for the first portion of information, where the first communication mode includes a dynamic spatial audio effect; and means for determining a second communication mode associated with the second classification for the second portion of information, where the second communication mode includes a static spatial audio effect.

According to certain embodiments, the dynamic spatial audio effect includes an audio effect emanating from a first virtual source location, moving along a trajectory to a second virtual source location, and wherein the static spatial audio effect comprises a static spatial audio effect at the second virtual source location. According to some embodiments, the communication mode of a first classified portion of information includes a dynamic spatial audio effect with a beginning virtual source position of the respective one of the one or more classified portions of information, a trajectory along which a virtual source position moves, and an ending virtual source position, wherein the dynamic spatial audio effect further comprises a speed with which the virtual source position moves along the trajectory based on a classification of the respective one or more classified portions of information. According to further embodiments, the communication mode of a first classified portion of information comprises a static spatial audio effect having a position and an angular range about the position, wherein a virtual source position of the static audio effect is confined within the angular range about the position.

BRIEF DESCRIPTION OF THE DRAWINGS

Figure 1:
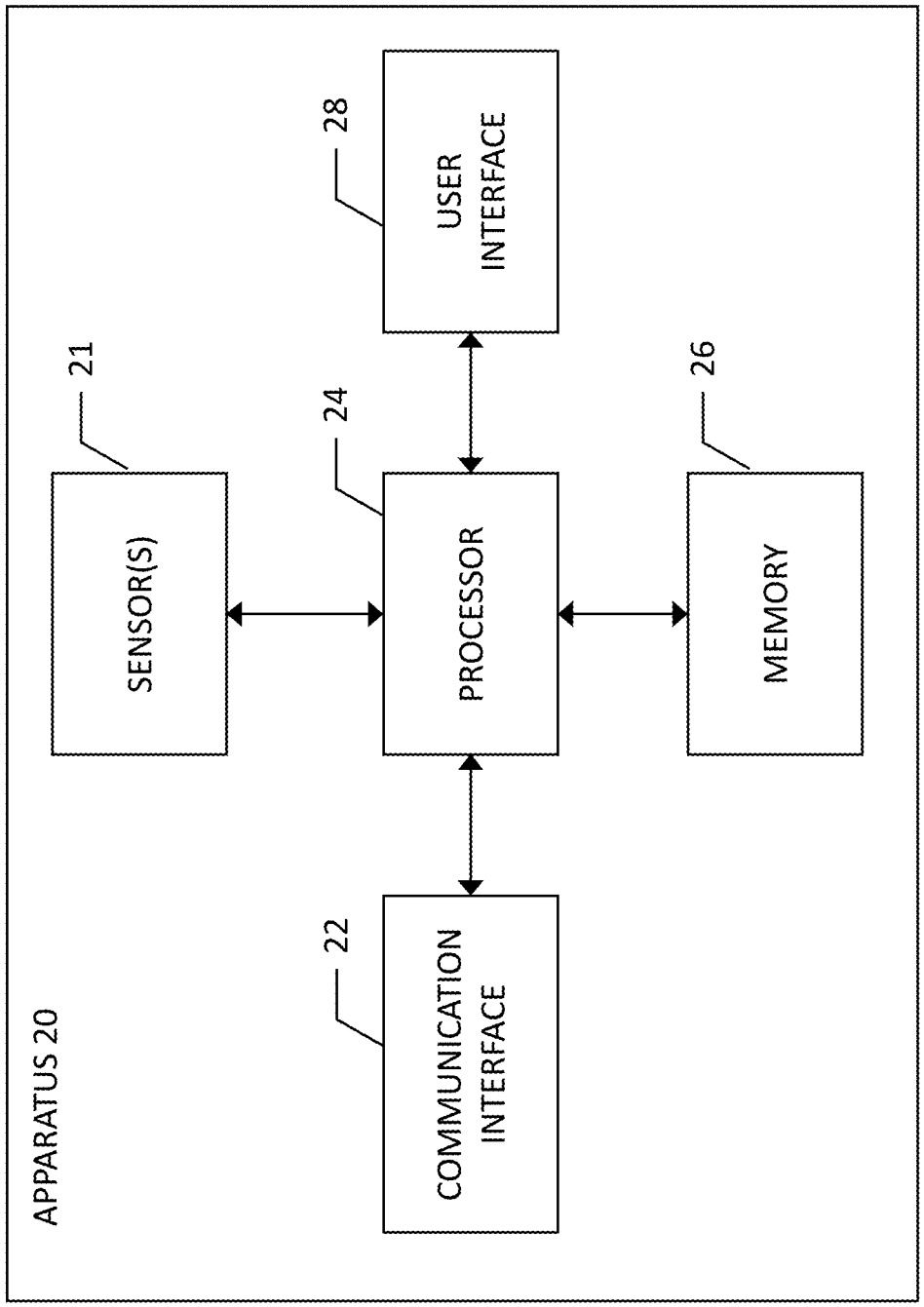
Figure 2:
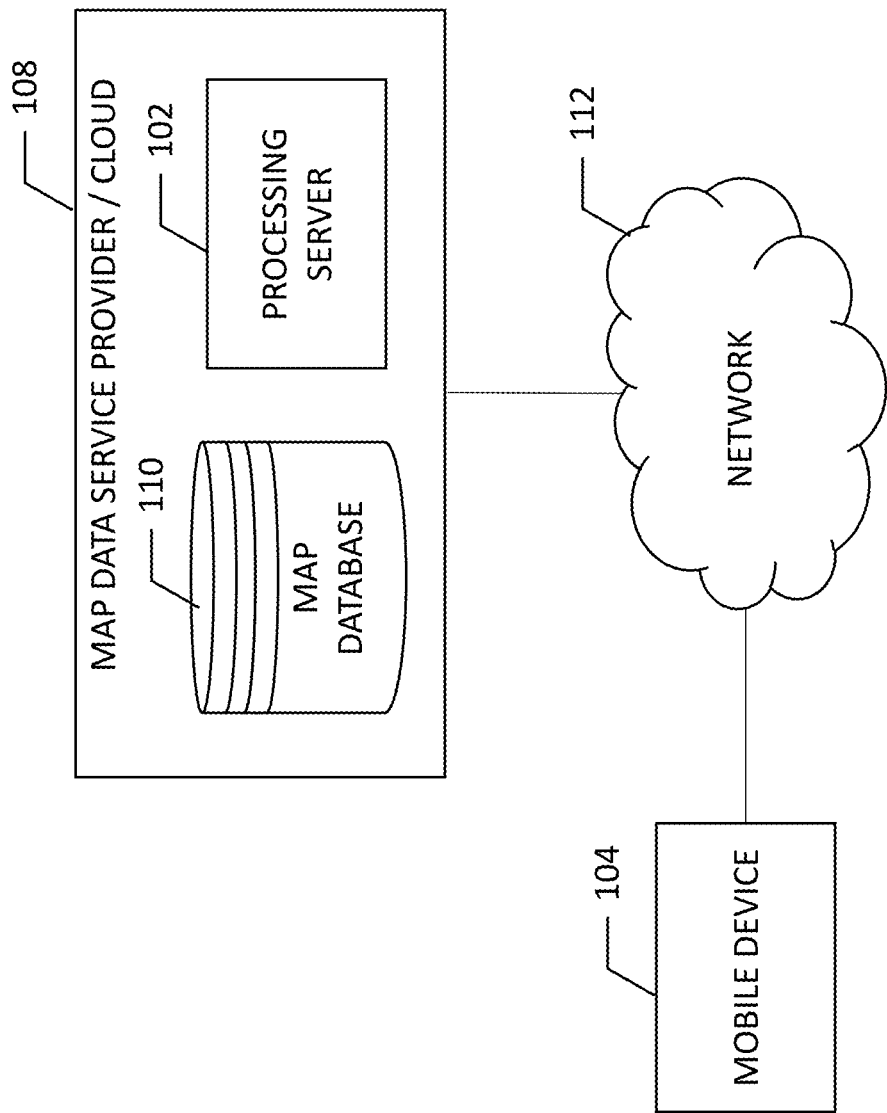
Figure 3:
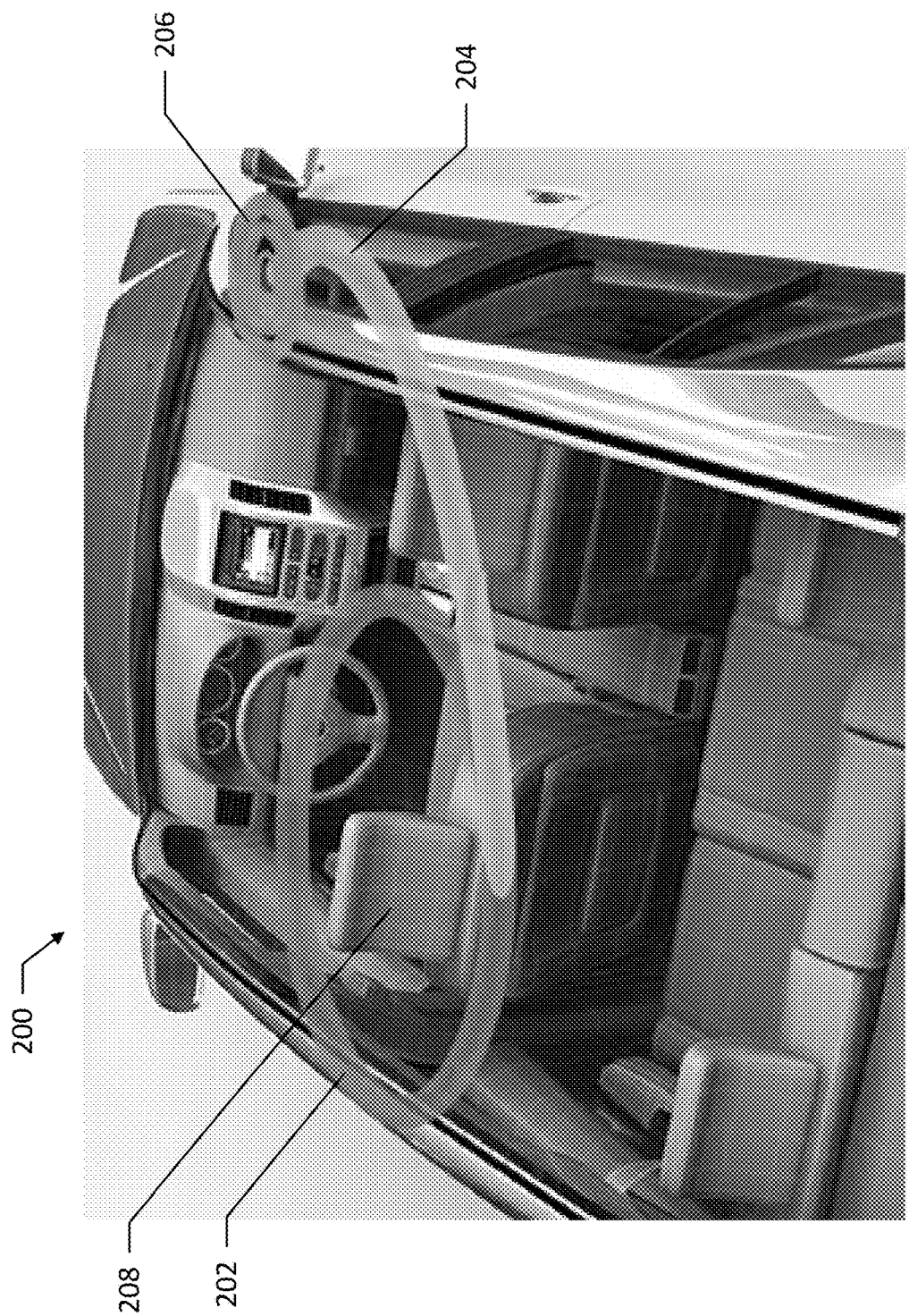
Figure 6:
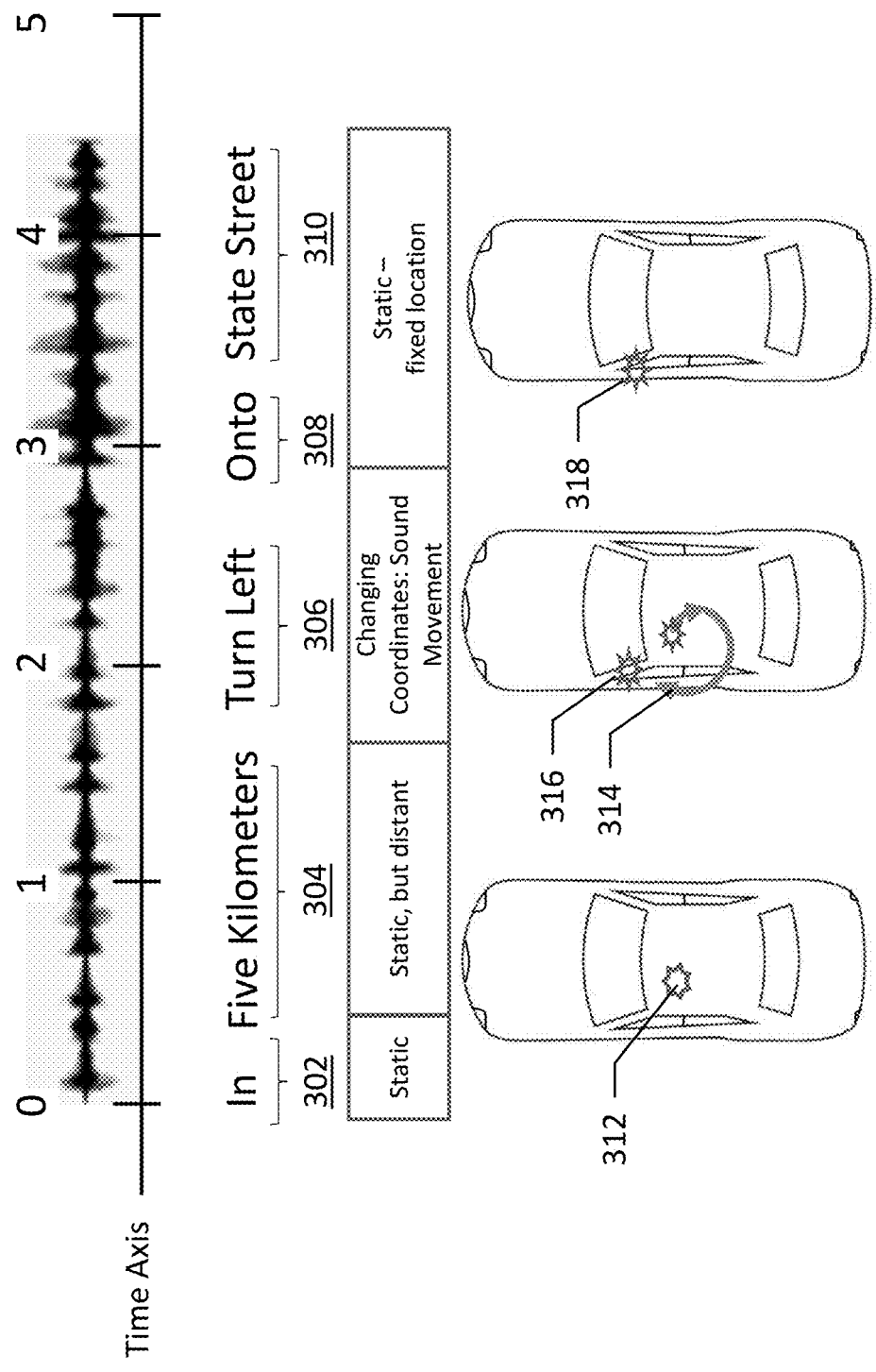
Figure 8:
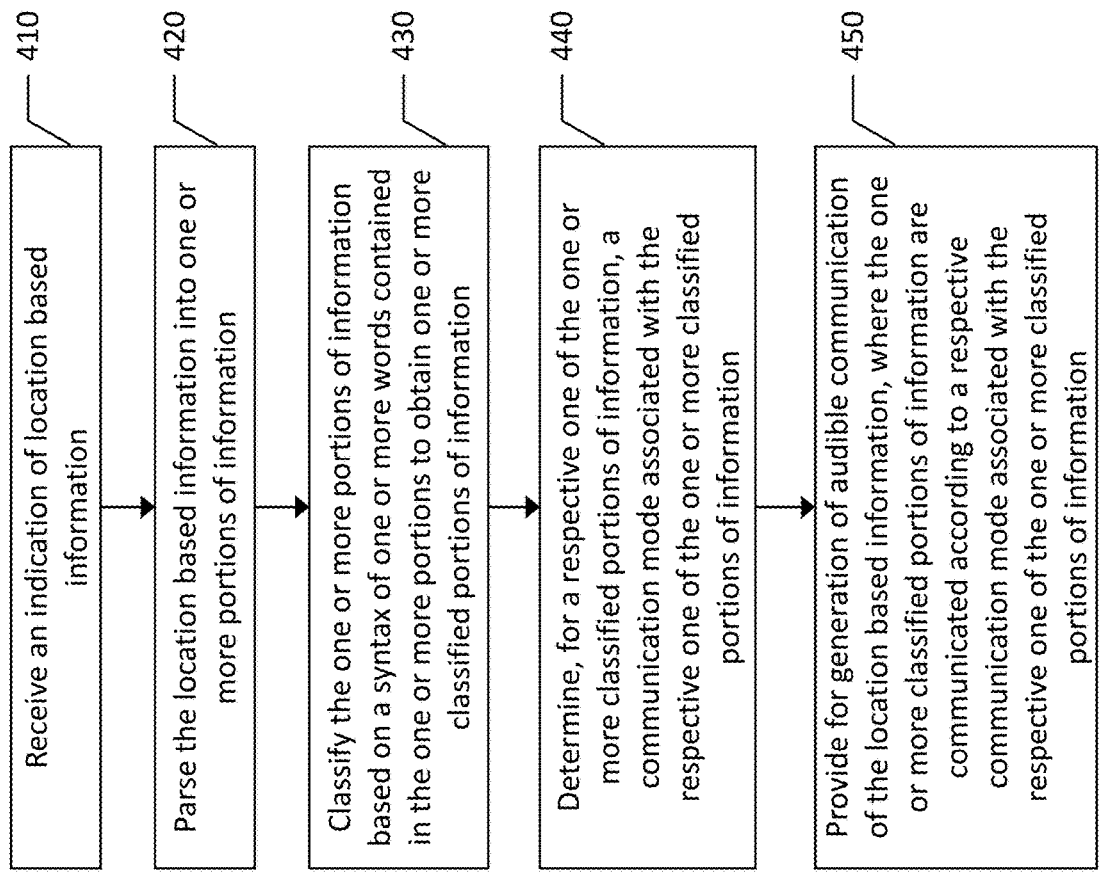

Having thus described certain example embodiments of the present invention in general terms, reference will hereinafter be made to the accompanying drawings which are not necessarily drawn to scale, and wherein:

FIG. 1 is a block diagram of an apparatus for providing syntax-based spatial auditory cues according to an example embodiment of the present disclosure;

FIG. 2 is a block diagram of a system of implementing navigational assistance or at least semi-autonomous control facilitated by spatial auditory cues according to an example embodiment of the present disclosure;

FIG. 3 depicts an example environment and graphical representation of auditory cues according to an example embodiment of the present disclosure;

FIG. 4 is a table illustrating syntactical difference between languages that are accommodated by syntax-based spatial auditory cues according to an example embodiment of the present disclosure;

FIG. 5 illustrates the different parts of a statement into which it is parsed, with each part being in a separate row according to an example embodiment of the present disclosure;

FIG. 6 illustrates a graphical depiction of the syntax-based spatial auditory cue according to an example embodiment of the present disclosure;

FIG. 7 illustrates the classification of words of a statement according to an example embodiment of the present disclosure; and FIG. 8 is a flowchart of a method for providing syntax-based spatial auditory cues according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present disclosure for providing an effective delivery of information through spatial audio in a navigational context. A combined approach of auditory stimuli is described herein to form a spatial sound language based on an analysis of portions of a statement. The spatial auditory cues described herein may provide a useful and easily interpreted instruction to a user in a manner that promotes user understanding of the auditory cues and precise location indications provided through auditory cues and instructions. The auditory cues of example embodiments may include voice prompts that provide instructions to a driver or operator of a vehicle with regard to navigational assistance or provide informative prompts regarding an environment of the driver or operator. These auditory cues may include one or more components of the cue, such as a distance (e.g., in five hundred meters), an instruction (e.g., turn right, proceed straight, etc.) and an identifier (e.g., a road name), along with other parts of speech such as prepositions, conjunctions, additional instructions, etc. Further, the auditory cues may include identification of reference points or distances, such as a voice prompt indicating "after 300 yards" or "after the intersection", for example. As described herein, embodiments may provide for a user interface with a navigation system or vehicle infotainment system. The user interface described herein provides an intuitive and easily understood auditory cues that convey information and relevant location to a user in a manner that helps the user understand the directional nature of the auditory cue. Further, embodiments described herein tailor a spatial auditory trajectory of each voice prompt based on an analysis of the syntax of each guidance prompt, regardless of a language that is delivering the voice prompt.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system or infotainment system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, a plurality of spatially arranged speakers, headphones, ear bud speakers, physical buttons, and/or other input/output mechanisms. The user interface 28 may be incorporated into a vehicle, such as a dedicated navigation system display/audio system or a device that can attach or associate with the vehicle physically and/or via a wireless communication link. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 26, and/or the like). In this regard, the apparatus 20 may provide spatial auditory cues via speakers, headphones, earbuds, or the like, to a user to convey information and a relevant location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE) and/or the fifth generation technology standard for broadband cellular networks, 5G. In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping application so as to present maps or otherwise provide navigation assistance. In order to support a mapping application, the computing device may include or otherwise be in communication with a geographic database, such as may be stored in memory device 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, lidar, ultrasonic and/or infrared sensors.

In example embodiments, a navigation system user interface may be provided to provide route guidance from an origin to a destination. Navigation systems may receive an indication of an origin, which may include a current location of a device on which the navigation system is operating (e.g., an in-vehicle navigation system or a mobile device, for example), and an indication of a destination where the user of the navigation system is going. In response to receiving the origin and destination pair, a route may be generated between the origin and destination. The route may be generated according to user preferences for fastest travel time, minimizing highways (e.g., limited access high-speed roadways), maximizing highways, shortest distance, etc. Further, waypoints may be provided between the origin and destination, or a route may include multiple, sequential destinations. Example embodiments provided herein may be used for a navigation system user interface to provide route guidance to the first destination, the last destination, or the ultimate destination with waypoints indicated in the route guidance from the origin and possibly points of interest along the route.

A map service provider database may be used to provide route guidance to a navigation system. FIG. 2 illustrates a communication diagram of an example embodiment of a system for implementing example embodiments described herein. The illustrated embodiment of FIG. 2 includes a mobile device 104, which may be, for example, the apparatus 20 of FIG. 1, such as a mobile phone, an in-vehicle navigation system, the vehicle itself, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider 108 may include a map database 110 that may include node data, road segment data or link data, point of interest (POI) data, traffic data or the like. The map database 110 may also include cartographic data, routing data, and/or maneuvering data. The map data can be organized in different map layers. According to some example embodiments, the road segment data records may be links or segments representing roads, streets, or paths, as may be used in calculating a route or recorded route information for determination of one or more personalized routes. The node data may be end points (such as representing intersections) corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an in-vehicle navigation system, such as an ADAS (advanced driver assistance system), a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through. While a "driver" is referenced herein, a driver may optionally refer to an occupant of a vehicle, or an occupant that is commanding/controlling an autonomous vehicle, for example.

Route guidance from an origin to a destination may be communicated to a user through visual and/or auditory cues including audible instructions. Beyond route guidance, other information or instructions may also be communicated via auditory cues. For example, point out points-of-interest, cautioning a driver/rider of upcoming traffic, delays, or alternate routes, or indicating other useful information to a user. Auditory cues are typically synthesized voice instructions that deliver spoken instructions to a driver. In the context of navigation, these spoken instructions are often regarding a next upcoming maneuver required to stay on a route to a destination. Navigation systems and routing engines may determine decision points within the road network corresponding to maneuvers, and these decision points may be provided to a text-to-speech engine for converting the maneuvers into spoken instructions. Spoken instructions may be the communication channel of choice, as opposed to written instructions on a display or visual instructions on a display, to improve safety, as the driver may be using their vision for the task of driving.

In the field of sound reproduction, improvements have been developed over years to enhance the auditory experience. Monoaural sound may be sufficient to convey a message; however, developments such as stereo sound and spatial audio methods (e.g., surround, binaural audio, Ambisonics, vector base amplitude panning (VBAP), virtual sound source positioning, etc.) have expanded the possibilities of using sound to simulate an entire three-dimensional environment and to convey rich auditory information such as the characteristic of emission of a sound source (e.g., is it a widespread source or a directional source), the sound source position, and distance from a listener. Further, according to embodiments of the present disclosure, the movement of a sound source in space may be conveyed using spatial audio methods. The characteristics of an acoustic space within which the sound is produced may be tuned to convey characteristics of a sound source with a high level of accuracy. These methods exploit the full capabilities of the human ear to perceive and discriminate more information about a sound event than simply its content.

Conventional voice navigation instructions are delivered as a message only without any spatial considerations. This approach may be sufficient in straightforward navigational situations, such as a rural road intersection without any unconventional road features proximate the intersection, but as the complexity of roads and related maneuvers increases, such as around dense urban environments, additional information may be desirable. Visual displays of route guidance information and point of interest information may be more detailed and may provide a user a greater understanding of their surroundings; however, this may distract a driver from a maneuver if they are moving, particularly in a densely populated area. The delivered voice instructions alone may not be sufficient for a driver to interpret a maneuver in a spatial context.

Provided herein is a method to solve the problem related to context awareness and how to provide spatially relevant auditory information, in the form of spoken or other auditory stimuli that aids the driver of a vehicle in performing the next action whether it is a maneuver or a handover event (e.g., transitioning from autonomous vehicle control to manual vehicle control). Further, embodiments described herein establish, based on syntactic elements of speech, how to convey information to a driver/occupant in a manner that is informative and provides information beyond the words used in the voice prompt.

While a vehicle is in an autonomous mode, for achieving a truly immersive experience, information about a vehicle's surroundings may be conveyed not only as content, but as spatially localized information relevant to a specific point outside of the vehicle. Further, while embodiments are described herein with regard to navigational assistance and providing navigational instructions to a driver, embodiments may be employed to provide information to a user regarding points of interest or other information that is associated with a location that can be communicated to a user through spatial auditory cues.

Embodiments described herein provide an effective delivery of information through spatial audio in the navigation context and in the informational context, where the manner of delivery of the information as spatial audio is determined based on parts of speech and the syntactic elements of information. The auditory cue may come in the form of spoken instructions such as a natural language sentence, delivering a more complex payload of information that cannot be unambiguously conveyed with a simple sound. The delivery of these spoken instructions and/or information may be done such that, spatially, such that certain elements of information are delivered with certain spatial techniques.

Different approaches are available for delivering spatial sound in a vehicle. Particularly the auditory cue described herein may be delivered using either a binaural approach with speakers adjacent to the driver's ears or Higher Order Ambisonics using an arrangement of multichannel speakers in a vehicle. Optionally, binaural and High Order Ambisonics can be used at the same time to create an improved perception of distance when a sound is retreating. Further, more conventional audio reproduction techniques may be used such as Surround Sound (e.g., 5.1 channel audio, 7.1 channel audio, etc.) or even simple stereo acoustic reproduction that can replicate movement in an audio cue.

In order to provide useful navigation assistance or point of interest information through spatial auditory cues of example embodiments, a location of the user and vehicle must be determined. This may be performed through a combination of GNSS (Global Navigation Satellite System) sensors and other vehicle sensors, such as inertial measurement units (IMUs) or the like, as represented by sensors 21 of apparatus 20 in FIG. 1. Other positioning means may optionally be used, such as location referencing using roadside objects, cellular signal or near-field communication signal fingerprinting or triangulation, etc. A coordinate pair, with varying degrees of accuracy dependent on the positioning methods may be used to determine the location of the vehicle. The determined location may be associated with a location on a digital map maintained, for example, by map data service provider 108 of FIG. 2. This determined location can be used with map data to identify relative locations between a vehicle or mobile device and points of interest, approaching navigational maneuvers, informative statements, etc.

Embodiments described herein may employ a "tour mode" where a user requests information on all points of interest as they travel along a road network. Further, navigational instructions may be provided to guide a user along a path that encounters the greatest number of or most significant points of interest. Optionally, a user may select one or more classifications of points of interest that they are interested in, such as historical buildings, architecturally interesting buildings, parks, etc. As a user travels along a road network, with or without navigational assistance, embodiments provided herein may provide auditory cues using spatial audio effects to provide information to a user in a contextually aware manner. The spatial audio effects may be applied to natural language statements through an analysis of the parts of speech and words within a statement as described below. These parts of speech and words may correspond to different spatial audio effects otherwise referred to herein as communication modes.

According to certain embodiments, a user of the vehicle, such a driver or an occupant, may provide a desired destination using physical controls or voice activation. Optionally, a destination may be predicted using collected mobility patterns. Once a destination has been established, a route to the destination may be generated. Such a route may include decision points where a driver may be required to perform a maneuver. Optionally, the route may include points of interest or waypoint that may be established based on user preferences, mobility patterns, crowd-sourced information such as interest/popularity, or the like. The decision points, points of interest, and waypoints may each correspond to a specific coordinate pair in the map that is along or proximate the route to the destination. While certain embodiments are used to convey instructions to a driver/occupant regarding maneuvers along a route, certain embodiments described herein can provide destination-agnostic information to a driver/occupant. Such information can include warnings, such as lane closure warnings, stalled vehicle or emergency vehicle warnings, traffic warnings, traffic information (e.g., all-clear information), or the like. As such, embodiments are not limited to navigational information.

According to an example embodiment employed for navigational purposes: using a current location of a vehicle, the location of a decision point, and the required maneuver, a spatial auditory cue may be generated. A speed of the vehicle may optionally be considered to provide a spatial auditory cue sufficiently ahead of a required maneuver and the speed of the vehicle may influence the speed at which a spatial audio effect is communicated. The spatial auditory cue may provide a natural language instruction or information to a driver or occupant of the vehicle. FIG. 3 illustrates a visual depiction of the three spatial auditory cues generated within the interior of a vehicle 200 according to the embodiments described herein. The spatial auditory cue may include multiple portions, such as a first portion that begins proximate the driver/occupant's head or in a specific virtual source location within the vehicle. This first portion of the auditory cue is illustrated as portion 202 of FIG. 3 surrounding the driver/occupant's head position 208. This first virtual source location does not need to be proximate the driver/occupant's head position 208, but could be positioned anywhere deemed appropriate to facilitate the second portion of the auditory cue which is dynamic. The second portion of the auditory cue of the illustrated embodiment or the "transition portion" has a dynamic virtual source location shown in FIG. 3 as path or trajectory 204, where the virtual source location moves from the first virtual source position along the trajectory 204 to a second virtual source position 206.

The dynamic virtual source location that moves along trajectory 204 represented by the arc provides a dynamic spatial transition, where a virtual source location or source point of the sound progresses from a position close to the driver's head position 208 and moves to a position aligned with the second virtual source position 206, which may be a point between the position of the driver's head 208 and a decision point, point of interest, or waypoint that is the subject of the auditory cue. The second virtual source position in certain embodiments is aligned with the decision point, point of interest, or waypoint, and may be a location between the driver, and more specifically the driver's head, and the location to which the driver's attention is to be drawn. Using spatial audio techniques, the location of the sound generated during the dynamic virtual source location moving along the trajectory 204 has a virtual source location that dynamically transitions from the driver to the location of interest.

The transition portion of the auditory cue corresponding to the dynamic virtual source location moving along trajectory 204 may provide a wandering voice producing natural language starting an instruction or informative statement at the driver's head and guiding the attention toward the decision point, point of interest, or waypoint. Provided the auditory cue is long enough to provide the first portion of the auditory cue at the first virtual source location at portion 202 and the second portion of the auditory cue along the trajectory 204, a third portion of the auditory cue may follow at the second virtual source location 206. Optionally, based on a length of the statement or a speed at which a statement is to be delivered (e.g., an approaching turn when a vehicle is traveling quickly), the speed of the dynamic virtual source location motion is, in certain embodiments, increased to complete the dynamic spatial audio effect in time to be of benefit to a driver or occupant.

While the first virtual source location, the trajectory 204, and the second virtual source location 206 are illustrated in a particular configuration in FIG. 3, these locations and trajectories may be varied depending on application and may be configured to virtually any position without deviating from the concepts described herein. For example, the trajectory 204 may be maintained in a frontal field of view/hearing of a driver/occupant. The position may optionally vary based on the type of audio cue to be conveyed. Thus, the relative positions of the audio cue to the driver/occupant are configurable and not limited to the illustrated positions of FIG. 3. According to an example embodiment where a virtual source location is not necessarily in front of a driver, a spatial audio effect may convey a virtual source location behind a driver or occupant of a vehicle warning of an approaching emergency vehicle or a vehicle approaching quickly that the driver/occupant should be aware of Such a spatial auditory cue may be dynamic, moving from behind a driver/occupant along a side on which a vehicle may pass, or the spatial auditory cue may be static, and positioned with a virtual source location indicating a direction from which a vehicle or emergency vehicle is approaching.

Auditory cues as described herein can include a variety of different formats to convey a variety of different types of information. Auditory cues may include navigational instructions, informative statements to a driver or occupant of a vehicle, a warning, or other information for which directionality is relevant. The directionality refers to the navigational instructions, statements, or warnings having an associated location where a direction indicated by the dynamic movement of the auditory cue provides a directional indication of a location associated with the auditory cue.

Navigational instructions of example embodiments described herein may include one or more components, such as a distance metric, an instruction, and an identifier. A distance metric may include a time or a distance between a location at which the auditory cue is provided to a location associated with the message of the auditory cue. An instruction may include a driver command to follow a particular path or information to inform the driver or occupant with regard to a point-of-interest. An identifier may include a name of a point-of-interest or street name onto which a driver is to turn to follow a path. An example of such an auditory cue including all three components includes: "In 500 meters, turn right on Columbia Parkway". In this example, the distance metric is "in 500 meters", the instruction is "turn right", and the identifier is "on Columbia Parkway". The distance metric may be in the form of time, such as "in 30 seconds, turn right on Columbia Parkway". Further, auditory cues may not require each of these components. For example, an auditory cue may simply state "turn right" or "turn right on Wilson Ave."

Beyond navigational instructions, example embodiments may provide information regarding points of interest. For example, if a vehicle is low on fuel or on battery charge, a navigation system or mobile device may provide information regarding gas stations or charging stations. In such an example, when a gas-powered vehicle is below an eighth of a tank of fuel, as the vehicle approaches a gas station, the auditory cue may state "In 500 feet, gas station on right" or further include relevant information such as "in 500 feet, gas station on right, $3.09/gallon". Such point-of-interest information may be the basis for auditory cues whether the vehicle is traveling along a route with navigational assistance or not. Further, auditory cues may provide warnings regarding accidents or other events. For example, an auditory cue may state: "caution, accident 500 feet ahead on right". Thus, auditory cues may be used for a variety of purposes, and example embodiments described herein provide a mechanism by which auditory cues are provided to a user in such a way as to be easily understood while also providing a directional indication of the information contained in the auditory cue.

Auditory cues are produced in a variety of lengths or durations depending upon the amount of information conveyed and the type of information conveyed. Further, the language of the auditory cue may cause the duration to vary as the same information or instructions may require more or fewer words in different languages. As voice prompts can vary broadly in their content and length, the manner of delivery among voice prompts of example embodiments is tailored based on the duration of a voice prompt and the content of the voice prompt. Because these auditory cue statements can vary in content so widely, applying a standard audio effect to a statement would not be appropriate. Thus, embodiments described herein decipher words and parts of speech from the statements in order to determine how to apply a spatial auditory effect to best convey the information of the statement to a driver or occupant of a vehicle.

In addition to variation in content, the duration of a statement can vary considerably. The duration of certain voice prompts can be under two seconds, such as a text-to-speech engine pronouncing the phrase "now turn right". However, duration can be considerably greater, such as a navigation instruction reciting "in 400 meters, turn right and then turn left onto Kaiser Friedrich Whilelm Damm strasse." For audio spatialization, the varying duration presents an issue, as in order to create a consistent user experience, an audio prompt has to have coherency of sound movements across different types of prompts. Thus, it is important to time which parts of the voice prompt are going to be presented as static (with reference to a user) and which parts will be dynamic, or in motion.

In terms of content, the dramatic difference in length of voice prompts also presents an issue as it is not consistent that only one action/verb is presented to the user (e.g. turn left and then turn right). Further, it is not consistent that the position in time of the action is found in the same place within a phrase. For example, "now turn right" versus "in five hundred meters turn right". Another example includes: "take the first exit and then proceed straight for two kilometers" versus "in three kilometers take exit sixteen into Kaiser Damm. In addition to content differences, different languages can distribute the same information differently across the same phrase. An example of this is illustrated in FIG. 4. As is evident, some languages focus on the verb describing the action around the center of the phrase, while other languages may place portions of that information at the end, or distribute portions on different parts of the phrase words that constitute one single instruction.

Embodiments described herein analyze the syntax of each guidance prompt and identifies descriptors of the type of information contained in each word or in each group of words. Syntax, as described herein, is the arrangement of words and phrases within one or more sentences or statements. This parsed and analyzed guidance prompt can then be processed through a sound spatialization engine that identifies what portions of the prompt are to be spatialized (e.g., through dynamic sound or static localized sound) and which portions are not spatialized (e.g., ambiguous source location or omnidirectional). Further, the spatialization engine identifies how to spatialize portions of the audio that are to have a "communication mode" such as a static location or a dynamic location. For a static location, a location of a virtual source position is established. For a dynamic location, a beginning virtual source location is identified together with an ending virtual source location, and a trajectory between them along which the virtual source moves during the dynamic spatial audio effect. Embodiments provided herein leverage the concatenation of parts of information about an upcoming maneuver or information to create a three-dimensional spatial sound effect that conveys the information contained by each part of the voice prompt, regardless of duration or language.

Embodiments described herein derive information to be conveyed to a driver or occupant of a vehicle in the form of navigational information, navigational instruction, warnings, points of interest, and other messages to be conveyed. This information of an example embodiment is in the form of natural language—regardless of the language used to generate the statement. Embodiments parse the natural language statement to identify different parts of speech or syntax of the words and phrases, and to classify each of the different parts of the natural language statement. The classification of the different parts of the statement according to their syntax can be performed through recognition of terms or words within the statement, and parts of speech within the context of the statement. An example embodiment of such parsing and classification is provided below.

The statement "in five kilometers, turn left onto State Street" may be generated by an apparatus of certain embodiments, such as through natural language generation by processor 24 of apparatus 20 of FIG. 1. This statement is parsed to identify different parts of the statement, each having a syntax. FIG. 5 illustrates the different parts of the statement into which it is parsed, with each part being in a separate row. The first part, "in" is identified as a preposition, and is not spatialized. As it is not spatialized, the word "in" will be audibly generated in a manner that has no specific direction, such as in an omnidirectional sound (where the sound appears to be coming from all around a listener) or an ambiguous direction, where there is no discernable direction from which the sound emanates.

The next element of information are the words "five kilometers". These words are classified as informational and include a distance. As the distance is relatively far (e.g., it could be 5+ minutes away based on travel speed and traffic), the words are not spatialized to a particular location, but given an audio characteristic of a distal, far-away sound. The next word of the statement "turn" is classified as informational and an action, such that audio spatialization is used. The spatialization effect is that of a "turn", where the apparent source of the audio relative to the user moves. The following term "left" identifies how the words "turn left" will be spatialized. According to an example embodiment, the phrase "turn left" is spatialized with a dynamic location that begins with a perceived sound location at the driver/occupant, and moves along a trajectory to a position ahead and to the left of the driver/occupant.

The following element of information is the word "onto", which, as a preposition, does not require particular movement or location; however, as the phrase "turn left" ended at a perceived location (virtual source location) ahead of and to the left of the driver/occupant, the word "onto" is given a static spatialization at the location where the phrase "turn left" ended. The final words "State Street" is a proper noun, such that the words do not have particular spatialization. However, as the navigational instruction is for a left turn, the perceived location for the audio reciting "State Street" remains at the end of the trajectory of the dynamic audio for "turn left". This conveys to a listener that the prior "turn left" instruction relates to the street of the name "State Street" and will be encountered on the left, where the name "State Street" was positioned in the audio field about the driver/occupant.

As described above and illustrated with respect to FIG. 5, statements and sentences are parsed to identify the different words and phrases of the statement or sentence, and based on a syntax of each word or phrase, the communication mode is determined. The communication mode can include dynamic and static audio presentation, with audio generated to have a fixed virtual source location or a dynamic virtual source location, a trajectory along which a virtual source location moves (e.g., curved, linear, smooth, periodic, etc.), a virtual source angular range (e.g., wide (~90 degrees or more), narrow (~45 degrees or less), moderate (~60 degrees)) whether that angular range is static or dynamic, a speed of movement of a virtual source along a trajectory, etc. The communication mode includes auditory effects that are perceived by the driver/occupant of a vehicle.

FIG. 6 is a graphical depiction of the syntax-based spatial auditory cue of FIG. 5. As shown, the preposition "in" 302 is conveyed in an auditory tone that lacks any specific directionality. This is represented as sound 312 located approximately at the driver or occupant of the vehicle, appearing to be of ambiguous location to the driver. If the vehicle is fully autonomous, the sound location may be considered for all occupants of the vehicle as they may all be passengers. The words "five kilometers" 304 are also lacking of any particular directionality, but include a spatial effect implying a distal sound to represent the substantial distance of the navigational instruction in the phrase. The words "turn left" 306 are dynamic and begin at a position proximate the driver/occupant, and proceed along arrow 314 to the left of the driver, finishing in a location of sound 316 which is ahead and to the left of the driver, signifying the approaching left turn. The preposition "onto" 308 is a static sound as is "State Street" 310; however, these words are recited to appear to be at the location where the dynamic movement ended, positioned as sound 318 ahead of and to the left of the driver/occupant to signify onto which road the vehicle is turning when it does turn left.

Embodiments described herein parse a natural language statement to classify each term therein to establish how to present the concatenated statement to a driver/occupant of a vehicle. FIG. 7 illustrates the classification of words of the statement of FIGS. 5 and 6 in markup language, where the words are classified as "static" (e.g., prepositions), "distance", "action type", "direction", and "next-street". The words falling under those classifications are also illustrated. Using this type of classification to establish how to audibly present words of a statement enables embodiments to be implemented on statements in any language and communicating any message, whether an instruction, informational statement, warning, etc.

Statements and sentences can include any number of words and phrases that are parsed as described herein and classified to establish how to deliver the words and phrases through audio effects. Statements can be short (e.g., turn now) or relatively long whereby multiple instructions are given. In the context of navigational instructions, a statement may often include four to six words and/or phrases such as with the example of FIGS. 5-7.

The dynamic nature of the auditory cues described herein establish how to present a statement as an auditory cue to a user based on the syntactic elements of the statement. Embodiments described herein enable the creation of a recognizable sound movement that creates virtual sound origins from which a sound is perceived to originate by a driver/occupant of a vehicle. By using static locations and dynamic movement of virtual sound origins, the information contained in a statement can be reinforced by the way in which a statement is perceived to move relative to the driver/occupant. In the event that the driver/occupant does not hear every word of a statement, such as when outside noises may obscure a portion of a statement, the movement and location of the elements of the statement can provide contextual clues to the driver/occupant of what was conveyed in the statement.

The dynamic portion of the auditory cue statement is intended to lead the driver's/occupant's attention toward one direction in space, such as where a driver/occupant needs to go or perform their next maneuver. To leverage a person's ability to locate sounds in space, a basic function of human perception, the transition portion of the auditory cue may be a moving, dynamic sound. The sound may be rendered as a directional virtual source moving on a curved trajectory in the horizontal plane. In this manner, the acoustic sound generating device, whether headphones, headrest speakers, stereo speakers, multi-channel speakers (e.g., 5.1 or 7.1 surround sound speakers) may generate a sound having a virtual source location, where a user may perceive the source of the sound generated by the sound generating device to be coming from the virtual source location. The device may further cause the virtual source location to move in the curved trajectory of the horizontal plane. Sounds in motion may provide stronger localization cues than static sounds and strong mental representations of spatial directions. While a curved trajectory is described with respect to example embodiments provided herein, other trajectories are possible, such as linear trajectories or poly-line trajectories, for example. The speed of the dynamic spatialized audio effect can be varied based on a duration of the words that are to be communicated in the dynamic communication mode or a speed at which a vehicle is moving, for example.

The communication mode, including dynamic and static spatialized audio effects, can include a position (in the case of a dynamic spatialized audio effect, a moving position) and an angular range about the position. In the case of a point of interest or navigation maneuver that is far into the distance (e.g., greater than one mile), the angular range may be narrow, as the location of the point of interest or maneuver is still relatively far away, and can be indicated by a sound at a specific location that is relatively finite. As a point of interest becomes closer or a navigational maneuver is approached, the angular range may widen as the point of interest or maneuver begins to occupy more of a field of view of a user. Further, a phrase such as "stay straight" as a navigational phrase may have a relatively wide angular range directly ahead of the vehicle, while a sharp right turn may have a comparatively narrow angular range since it occupies considerably less of the driver or occupant's field of view.

As autonomous vehicle control begins to take shape, new interaction paradigms between users can be exploited. Vehicle autonomy can include partial autonomy with driver assistance features such as lane-keep assist, adaptive cruise control, and brake assist features, for example, but can also include full autonomy where a driver becomes a passenger in the vehicle while the vehicle controls all functions of driving. In some instances, vehicle autonomy may transition during different phases of a driving event, such as where a driver begins to drive along a route, but then "handover" vehicle control to an autonomous system. Handover events and experiences may require a complete engagement of the user, such as to receive cues as to when to take over or relinquish control of the vehicle which requires the full attention of the driver. A "spatially informed driver" may be informed of where the next action needs to take place in the handover experience. In full autonomous mode, where all vehicle users are passengers, interaction with the vehicle may be reduced to general instructions regarding destinations and the vehicle assumes an informative and/or entertaining role in the interaction. Further, in a higher degree of automation, vehicles may no longer resemble vehicles as conventionally used today, and may adapt into transport units that can include alienation from the surroundings outside the transport unit. Spatial awareness through sound augmentation of reality can offer a discrete solution to contrast alienation.

While embodiments may be implemented in a vehicle as a navigational aid or route guidance mechanism, embodiments may optionally be implemented for a pedestrian or operator of other mode of transportation, such as a bicycle. In such a manner, a pedestrian or cyclist may use headphones or earbuds, and may use example embodiments described herein in the same manner as an automotive implementation.

FIG. 8 is a flowchart illustrative of one or more methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 8 illustrates a method for providing syntax-based spatial auditory cues to facilitate user interaction with navigational assistance or at least semi-autonomous vehicle control. As shown, an indication of location based information is received at 410. This information may be in the form of a navigational instruction, point of interest information, a warning regarding a nearby hazard, etc. The location based information is parsed at 420 into one or more portions of information. At 430, the one or more portions of information are classified based on a syntax of one or more words contained in the one or more portions to obtain one or more classified portions of information. For a respective one of the one or more classified portions of information, a communication mode associated with the respective one or more classified portions of information are determined at 440. At 450, audible communication is provided for generation of the location based information, where the one or more classified portions of information are communicated according to a respective communication mode associated with the respective one of the one or more classified portions of information.

In an example embodiment, an apparatus for performing the methods of FIG. 8 above may include a processor (e.g., the processor 24) configured to perform some or each of the operations (410-450) described above. The processor may, for example, be configured to perform the operations (410-450) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-450 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive an indication of location based information in the form of a natural language statement;
   divide the location based information into one or more syntactic elements;
   classify the one or more syntactic elements based on a syntactic function of one or more words contained in the one or more syntactic elements to obtain one or more classified syntactic elements, wherein a first classification is determined for a first syntactic element of the one or more syntactic elements based on a verb within the first syntactic element and a second classification is determined for a second syntactic element of the one or more syntactic elements based on a location identifier within the second syntactic element;
   determine, for a respective one of the one or more classified syntactic elements, a communication mode associated with the respective one of the one or more classified syntactic elements; and
   provide for generation of audible communication of the location based information, wherein the one or more classified syntactic elements are communicated according to a respective communication mode associated with the respective one of the one or more classified syntactic elements.

2. The apparatus of claim 1, wherein the communication mode comprises at least one of: a static spatial audio effect and a dynamic spatial audio effect.

3. The apparatus of claim 1, wherein causing the apparatus to provide for generation of audible communication of the location based information comprises causing the apparatus to:
   provide for generation of audible communication of a first classified syntactic element of the one or more classified syntactic elements associated with a first communication mode; and
   provide for generation of audible communication of a second classified syntactic element of the one or more classified syntactic elements associated with a second communication mode, wherein the first communication mode is different from the second communication mode.

4. The apparatus of claim 3, wherein the first communication mode comprises a static spatial audio effect and wherein the second communication mode comprises a dynamic spatial audio effect.

5. The apparatus of claim 1, wherein causing the apparatus to determine, for a respective one of the one or more classified syntactic elements, a communication mode associated with the respective one of the one or more classified syntactic elements comprises causing the apparatus to:
   determine a first communication mode associated with the first classification for the first syntactic element, wherein the first communication mode comprises a dynamic spatial audio effect; and
   determine a second communication mode associated with the second classification for the second syntactic element, wherein the second communication mode comprises a static spatial audio effect.

6. The apparatus of claim 5, wherein the dynamic spatial audio effect comprises an audio effect emanating from a first virtual source location, moving along a trajectory to a second virtual source location, and wherein the static spatial audio effect comprises a static spatial audio effect at the second virtual source location.

7. The apparatus of claim 1, wherein the communication mode of a first classified syntactic element comprises a dynamic spatial audio effect with a beginning virtual source position of the respective one of the one or more classified syntactic elements, a trajectory along which a virtual source position moves, and an ending virtual source position, wherein the dynamic spatial audio effect further comprises a speed with which the virtual source position moves along the trajectory based on a classification of a respective one or more classified syntactic elements.

8. The apparatus of claim 1, wherein the communication mode of a first classified syntactic element comprises a static spatial audio effect having a position and an angular range about the position, wherein a virtual source position of the static spatial audio effect is confined within the angular range about the position.

9. A computer program product comprising at least one non-transitory computer-readable storage medium having computer-executable program code instructions stored therein, the computer-executable program code instructions comprising program code instructions to:

receive an indication of location based information in the form of a natural language statement;

divide the location based information into one or more syntactic elements;

classify the one or more syntactic elements based on a syntactic function of one or more words contained in the one or more syntactic elements to obtain one or more classified syntactic elements, wherein a first classification is determined for a first syntactic element of the one or more syntactic elements based on a verb within the first syntactic element and a second classification is determined for a second syntactic element of the one or more syntactic elements based on a location identifier within the second syntactic element;

determine, for a respective one of the one or more classified syntactic elements, a communication mode associated with the respective one of the one or more classified syntactic elements; and provide for generation of audible communication of the location based information, wherein the one or more classified syntactic elements are communicated according to a respective communication mode associated with the respective one of the one or more classified syntactic elements.

10. The computer program product of claim 9, wherein the communication mode comprises at least one of: a static spatial audio effect and a dynamic spatial audio effect.

11. The computer program product of claim 9, wherein the program code instructions to provide for generation of audible communication of the location based information comprise program code instructions to:

provide for generation of audible communication of a first classified syntactic element of the one or more classified syntactic elements associated with a first communication mode; and provide for generation of audible communication of a second classified syntactic element of the one or more classified syntactic elements associated with a second communication mode, wherein the first communication mode is different from the second communication mode.

12. The computer program product of claim 11, wherein the first communication mode comprises a static spatial audio effect and wherein the second communication mode comprises a dynamic spatial audio effect.

13. The computer program product of claim 9, wherein the program code instructions to determine, for a respective one of the one or more classified syntactic elements, a communication mode associated with the respective one of the one or more classified syntactic elements comprise program code instructions to:

determine a first communication mode associated with the first classification for the first syntactic element, wherein the first communication mode comprises a dynamic spatial audio effect; and determine a second communication mode associated with the second classification for the second syntactic element, wherein the second communication mode comprises a static spatial audio effect.

14. The computer program product of claim 13, wherein the dynamic spatial audio effect comprises an audio effect emanating from a first virtual source location, moving along a trajectory to a second virtual source location, and wherein the static spatial audio effect comprises a static spatial audio effect at the second virtual source location.

15. The computer program product of claim 9, wherein the communication mode of a first classified syntactic element comprises a dynamic spatial audio effect with a beginning virtual source position of the respective one of the one or more classified syntactic elements, a trajectory along which a virtual source position moves, and an ending virtual source position, wherein the dynamic spatial audio effect further comprises a speed with which the virtual source position moves along the trajectory based on a classification of a respective one or more classified syntactic elements.

16. The computer program product of claim 9, wherein the communication mode of a first classified syntactic element comprises a static spatial audio effect having a position and an angular range about the position, wherein a virtual source position of the static spatial audio effect is confined within the angular range about the position.

17. A method comprising:

receiving an indication of location based information in the form of a natural language statement;

dividing the location based information into one or more syntactic elements;

classifying the one or more syntactic elements based on a syntactic function of one or more words contained in the one or more syntactic elements to obtain one or more classified syntactic elements, wherein a first classification is determined for a first syntactic element of the one or more syntactic elements based on a verb within the first syntactic element and a second classification is determined for a second syntactic element of the one or more syntactic elements based on a location identifier within the second syntactic element;

determining, for a respective one of the one or more classified syntactic elements, a communication mode associated with the respective one of the one or more classified syntactic elements; and providing for generation of audible communication of the location based information, wherein the one or more classified syntactic elements are communicated according to a respective communication mode associated with the respective one of the one or more classified syntactic elements.

18. The method of claim 17, wherein the communication mode comprises at least one of: a static spatial audio effect and a dynamic spatial audio effect.

* * * * *